US009026861B2

(12) United States Patent
Peck

(10) Patent No.: US 9,026,861 B2
(45) Date of Patent: May 5, 2015

(54) DEBUG TRACE STREAM TIMESTAMPING USING DOWNSTREAM CORRELATION

(71) Applicant: Texas Instruments Incorporated, Dallas, TX (US)

(72) Inventor: Jason L. Peck, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 213 days.

(21) Appl. No.: 13/633,752

(22) Filed: Oct. 2, 2012

(65) Prior Publication Data

US 2014/0095940 A1   Apr. 3, 2014

(51) Int. Cl.
*G06F 11/00* (2006.01)
*G06F 11/36* (2006.01)

(52) U.S. Cl.
CPC .................................. *G06F 11/3632* (2013.01)

(58) Field of Classification Search
USPC ....................................................... 714/45, 25
See application file for complete search history.

(56) References Cited

U.S. PATENT DOCUMENTS

2009/0125756 A1*   5/2009   Swaine et al. .................. 714/45
2013/0159780 A1*   6/2013   Bedwell et al. ................. 714/45

\* cited by examiner

*Primary Examiner* — Sarai Butler
(74) *Attorney, Agent, or Firm* — Robert D. Marshall, Jr.; Frank D. Cimino

(57) ABSTRACT

A method of correlating the timing of multiple interleaved trace data streams. A Time Stamp Trace stream logic monitors the event trace stream for a synchronization point. When a synchronization point is detected a time stamp value is inserted into the trace stream along with any relevant identification markers available in the detected synchronization point.

4 Claims, 3 Drawing Sheets

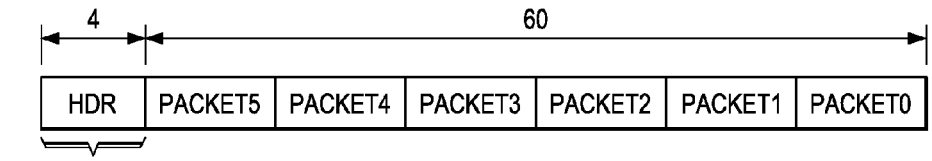
01xx - DSPTX
0100 - DSPTX #0
0101 - DSPTX #1
0110 - DSPTX #2
0111 - DSPTX #3
FIG. 4
| SIGNAL | WIDTH | CLOCK | DRIVER | DESCRIPTION |
|---|---|---|---|---|
| EEP_TSID | 8 | TRC_CLK | CT_CPDTF | 8-BIT TIMESTAMP ID |
FIG. 5
| SIGNAL | WIDTH | CLOCK | DRIVER | DESCRIPTION |
|---|---|---|---|---|
| TSVALUE | 64 | TRC_CLK | DebugSS | TIMESTAMP VALUE |
FIG. 6
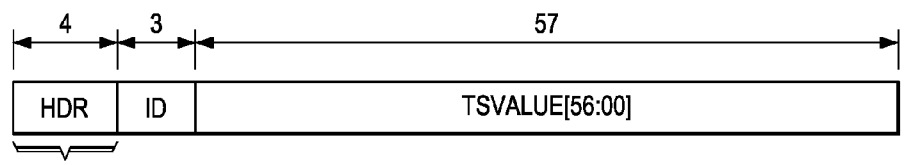
10xx - DGPTS
1000 - DSPTX #0
1001 - DSPTX #1
1010 - DSPTX #2
1011 - DSPTX #3
FIG. 7

DEBUG TRACE STREAM TIMESTAMPING USING DOWNSTREAM CORRELATION

TECHNICAL FIELD OF THE INVENTION

The technical field of this invention is debug trace generation.

BACKGROUND OF THE INVENTION

Debugging of embedded solutions has always been a difficult job. As processors become faster and more complex, debugging and development with the current debug technology becomes more difficult. In order to address these complex issues, greater visibility into the program operation is needed. Three areas in which greater visibility is desired are program counter tracing, cycle accurate profiling, and load and store data logging. Access to this data may be available through a dedicated Debug Port. However, each of these problems demands a tremendous amount of information. Simply supplying a large number of high frequency pins to view all of this data is neither practical nor cost effective, and an encoding scheme is needed to further compress all of this data. An encoding has been used that encodes Program Counter (PC) tracing, cycle accurate timing of all instructions, and load and store data logging. All of this data can be transmitted across the same pins on the Debug Port.

The debug port is a tool that provides for the export of software or hardware generated trace information to an external recorder. The trace port utilizes a transmission format that addresses the requirements without noticeably compromising the format efficiency for any given implementation. The transmission format primitives are viewed as a trace export instruction set. All processors use this instruction set to describe the system activity within a device. Each processor can describe the system activity in any manner that uses the instruction set and the rule set governing its use.

It is important to note that the external transmission rates/pins are fixed by the deployed receiver technology. These rates will remain relatively constant over time. This implies that as CPU clock rates increase, there will be increasing pressure to optimize the format to get the most compressed representation of system activity. This will be necessary just to maintain the status quo. Fortunately, the transmission format used provides an efficient means to represent the system activity. However, this efficiency comes at the expense of a larger on-chip hardware expenditure in order to gain the compression efficiency. This gives the processors the capability to improve the efficiency of their export bandwidth as it is stressed by CPU clock rate increases. The steady march to faster CPU clock rates and denser manufacturing processes will necessitate taking advantage of all compression opportunities and the best available physical transmission technology.

The transmission format is designed to provide designers the ability to:

Optimize bandwidth utilization (most real information sent in minimum bits/second);

Chose less efficient but more cost effective representations of system activity.

Mix of both of the above approaches (i.e. optimize PC trace transmission efficiency while implementing less efficient memory access export).

This gives different processors the ability to represent their system activity in forms most suitable to their architecture.

Tradeoffs have to be made since there are numerous cost/capability/bandwidth configuration requirements. Adjustments can be made to optimize and improve the format over time.

The transmission format remains constant over all processors while the nature of the physical transmission layer can be altered. These alterations can take three forms:

Transmission type (differential serial or conventional single ended I/O);

Number of pins allocated to the transmission;

Frequency of the data transmission.

This means that the format representing the system activity can and is viewed as data by the actual physical mechanism to be transmitted. The collection and formatting sections of the debug port should be implemented without regard to the physical transmission layer. This allows the physical layer to be optimized to the available pins and transmission bandwidth type without changing the underlying physical implementation. The receiver components are designed to be both physical layer and format independent. This allows the entire transmit portion to evolve over time.

A 10-bit encoding is used to represent the PC trace, data log, and timing information. The trace format width has been decoupled from number of transmission pins. This format can be used with any number of transmission pins. The PC trace, Memory Reference information, and the timing information are transmitted across the same pins.

Packets can contain opcodes or data, or both. A code packet contains an opcode that indicates the type of information being sent. The opcode can be 2 to 10 bits long. The remainder of the code packet will hold data associated with that opcode.

In many cases, additional data needs to be associated with an opcode. This data is encoded in subsequent packets referred to as data packets. Data packets contain information that should be associated with the previous opcode.

A sequence of packets that begins with code packet and includes all of the data packets that immediately follow the code packet is referred to as a command. A command can have zero or more parameters. Each parameter is an independent piece of data associated with the opcode in the command. The number of parameters expected depends on the opcode. The first parameter of a command is simply encoded using data packets following a code packet. The first data packet of subsequent parameters is marked with the 10 opcode.

The interpretation of a command is dependent on two factors, the opcode of the command, and the number of parameters included in the command. In other words, a code packet has one meaning if it is immediately followed by another code packet, but the same packet can take on an entirely different meaning if it is succeeded with data packets. Trace opcodes are shown in Table 1.

TABLE 1

| | |
|---|---|
| 00000 0000 | No Information/End of Buffer |
| 000000 0001 | Start Repeat Single |
| 000000 0010 | PC Trace Gap |
| 000000 0011 | Register Repeat |
| 000000 0100 | NOP SP loop |
| 000000 0101 | SPLOOP marker |
| 000000 0110 | Timing Trace Gap |
| 000000 0111 | Command Escape |
| 000000 1000 | Exception Occurred |
| 000000 1001 | Exception Occurred with Repeat Single |
| 000000 1010 | Block Repeat 0 |
| 000000 1011 | Block Repeat 0 with Repeat Single |
| 000000 1100 | Block Repeat 1 |

TABLE 1-continued

| | |
|---|---|
| 000000 1101 | Block Repeat 1 with Repeat Single |
| 000000 1110 | Memory Reference Trace Gap |
| 000000 1111 | Periodic Data Sync Point |
| 000001 0xxx | Timing Sync Point |
| 000001 1xxx | Memory Reference Sync Point |
| 000010 xxxx | PC Sync Point/First/Last/ |
| 000011 000x | PC Event Collision |
| 000011 001x | Reserved |
| 000011 01xx | Reserved |
| 000011 1xxx | Reserved |
| 00010x xxxx | Extended Timing Data |
| 00011x xxxx | CPU and ASIC Data |
| 0010xx xxxx | Reserved |
| 001100 0000 | Memory Reference Trace Gap (legacy) |
| 001100 0001 | Periodic Data Sync Point (legacy) |
| 0011xx xxxx | Memory Reference Block |
| 01xxxx xxxx | Relative Branch Command/Register Branch |
| 10xxxx xxxx | Continue |
| 11xxxx xxxx | Timing |

The PC Sync Point command is used to indicate several program events. It is used to mark periodically generated PC and timing synchronization points, the start of a trace segment, the end of a trace segment, a debug halt, Reset a trigger and other events. A parameter in this command conveys the reason for the PC Sync Point.

The PC Sync Point, Timing Sync Point, and Data Sync Point commands are used together to align the PC trace data with the timing information. When PC Sync Points are generated, they initiate Memory Reference Sync Points. Timing Sync Points are generated only when timing is turned on. When timing is turned on, a Timing Sync Point and PC Sync Point pair serves as a starting point for interpretation of the trace data. When timing is off, a PC Sync Point is sufficient for interpretation of the trace data. When PC Trace is turned off, Data Sync Points are sufficient to interpret the trace.

Inserting periodic Sync Points in the trace stream gives the user multiple points at which to begin interpretation of the trace data. It also allows the interpretation of the data when the buffer in the trace receiver overflows and the Trace Start command or earlier Sync Points are discarded.

SUMMARY OF THE INVENTION

Typically the trace protocol implemented by a trace source will include at least one event stream, a local timing stream, and a means of correlating the two periodically.

When an SoC adds multiple trace sources there becomes a need to interleave the multiple trace sources and a need to correlate the information generated across the multiple trace sources.

The solution to this problem is to create a downstream correlation mode of operation. In this mode, timestamp trace stream (TTS) logic monitors the stream of a single trace source for a synchronization point. When a sync point is observed the TTS logic inserts the timestamp value present into its own trace stream along with any relevant identification marker that may be available in the observed sync point.

BRIEF DESCRIPTION OF THE DRAWINGS

These and other aspects of this invention are illustrated in the drawings, in which:

FIG. 4 shows the data format of the DSPTX stream;

FIG. 5 shows the signal description of the EEP interface;

FIG. 6 shows the signal description of the Debug Timestamp;

FIG. 7 shows the data format of the Timing Synchronization packet.

DETAILED DESCRIPTION OF PREFERRED EMBODIMENTS

Figure 1:
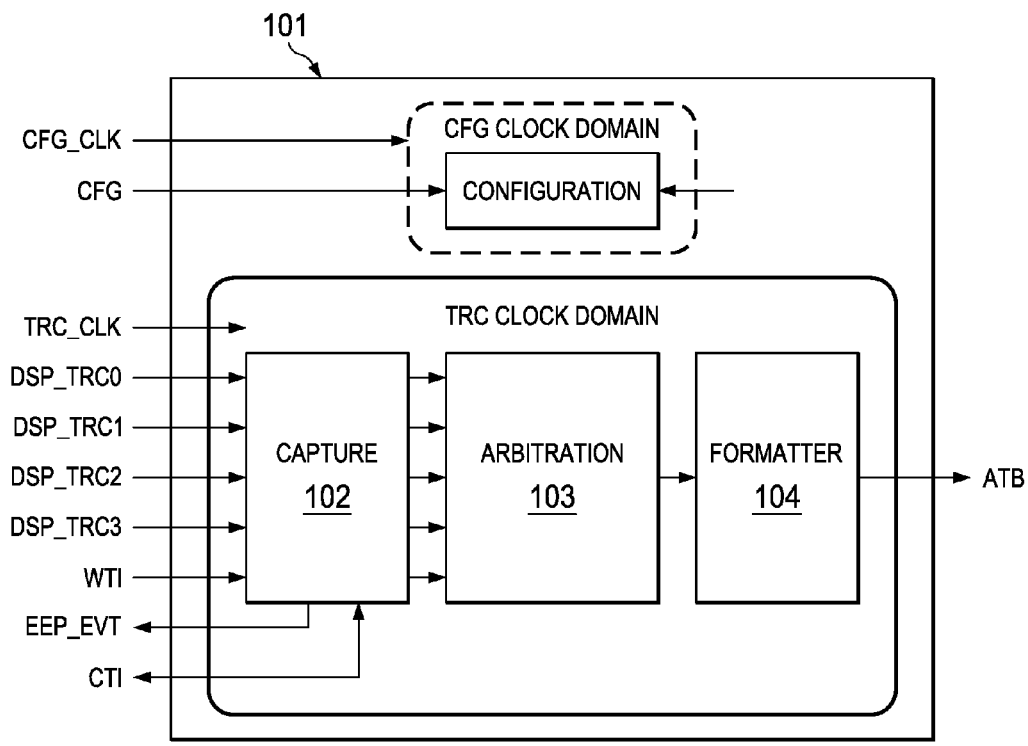
FIG. 1 shows a block diagram of the ct_cpdtf trace data formatter.

One embodiment of this invention is in the Texas Instruments cTools CorePac DSP Trace Formatter (ct_cpdtf). The architecture of the ct_cpdtf module is shown in FIG. 1, and consists of a configuration interface 101, a capture block 102 that is capable of buffering a plurality of DSP Trace Export (DSPTX) sources, and manages the Debug Time Stamps (DBGTS). Arbitration block 103 schedules the forwarding of DSPTX and DBGTS data to Formatter block 104 that encodes the captured DSPTX and DBGTS data into an Advanced Microcontroller Bus Architecture (AMBA) compliant data stream.

Figure 2:
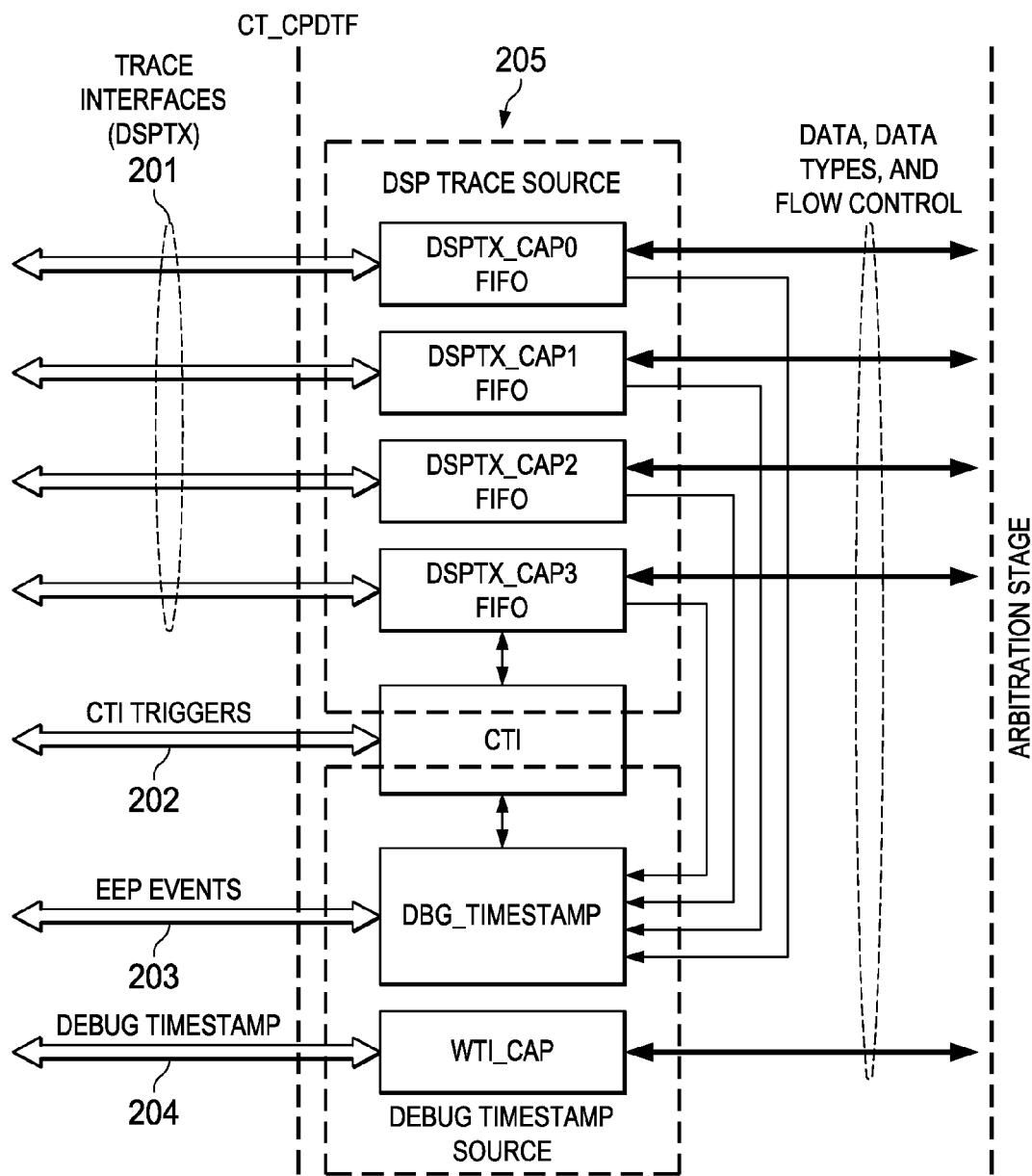
FIG. 2 shows the capture block of the ct_cpdtf.

FIG. 2 shows a more detailed diagram of the Capture Block. This block supports a plurality of independent DSPTX sources 201, with FIFO buffers 205 for each source. The Cross Trigger Interface (CTI) out 202 indicates that a trigger trace packet has been captured.

FIG. 4 shows the data format of the DSPTX sources.

The format of the data on the External Event Profiling Interface (EEP) 103 is shown in FIG. 5.

The format of the Debug Timestamp 104 is shown in FIG. 6.

Figure 3:
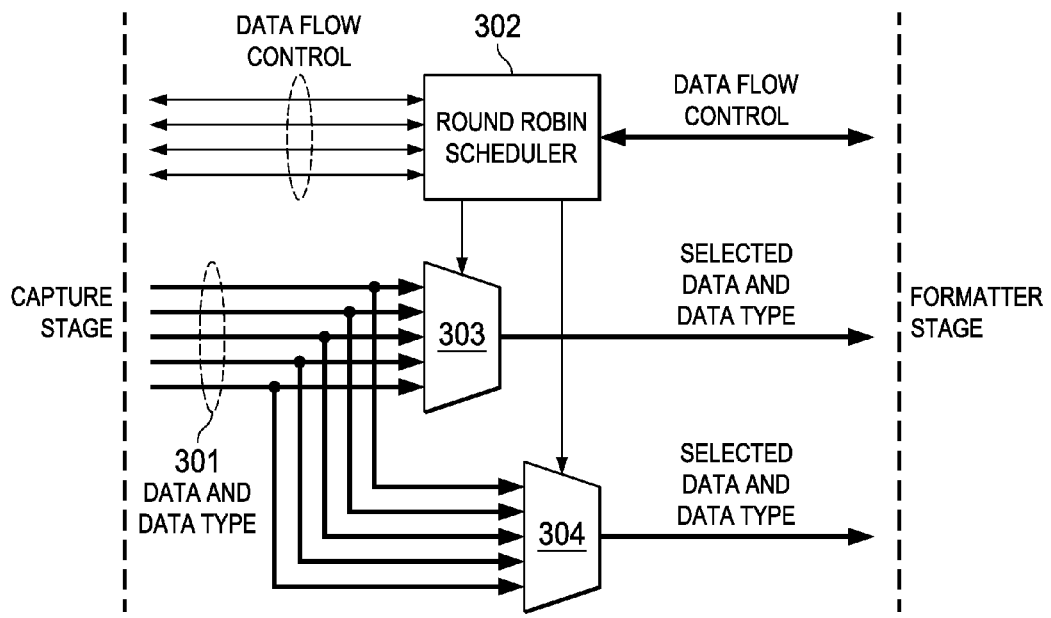
FIG. 3 shows the arbitration block of the ct_cpdtf.

FIG. 3 shows the arbitration block where 301 is the input from the capture stage, scheduler 302 implements a simple round robin scheduling algorithm with fixed priority. Multiplexers 303 and 304 select and forward two simultaneous 64 bit data streams to the formatter for creating the final formatted data stream.

In a typical embodiment of the invention the trace stream will include at least one event stream, a local timing stream, and a means for correlating the two streams periodically. When multiple trace sources are implemented and are interleaved, the timing needs to be correlated between the streams from the plurality of sources.

To implement this correlation a Time Stamp Trace Stream (TTS) logic monitors each stream for a synchronization point by looking for the data pattern 00__0001__0xxx where xxx a 3 bit ID defining the stream source. When a synchronization point (sync point) data packet is found the TTS logic inserts the time stamp value present into its own trace stream along with any other relevant information that may be present in the synchronization point. The format of the synchronization point data packet is shown in FIG. 7.

What is claimed is:
1. A method of trace timing correlation comprising the steps of:
receiving a trace event data stream, the trace data stream including periodic sync points with corresponding source identification information giving points to begin interpretation of trace data of the trace data stream;
receiving a local timing data stream
monitoring the received trace event data stream for the presence of a sync point;
upon detection of a sync point inserting a time stamp value into the local timing data stream; and upon inserting the time stamp value into the local timing data stream inserting the source identification information present in the sync point into the local timing data stream.

2. The method of claim 1 wherein:

said step of monitoring the received trace event data stream detects the sync point by locating the data pattern 00_0001_0xxx where xxx corresponds to the trace event data stream's source identification.

3. The method of claim 1 wherein:

said step of receiving a trace event data stream receives a plurality of trace event data streams from a plurality of sources.

4. The method of claim 3 wherein:

said monitoring and inserting steps operate upon each received one of the plurality of trace event data streams independently.

\* \* \* \* \*